United States Patent [19]

Nishiyama et al.

[11] Patent Number: 4,886,848

[45] Date of Patent: Dec. 12, 1989

[54] FLAME RETARDANT THERMOPLASTIC POLYURETHANE RESIN COMPOSITION

[75] Inventors: Hidemi Nishiyama, Chigasaki; Kenichi Ohtani, Hiratsuka, both of Japan

[73] Assignee: The Furukawa Electric Co., Ltd., Tokyo, Japan

[21] Appl. No.: 126,000

[22] Filed: Nov. 27, 1987

[30] Foreign Application Priority Data

Dec. 2, 1986 [JP] Japan ................... 61-287197

[51] Int. Cl.$^4$ ............................. C08K 5/15
[52] U.S. Cl. ..................... 524/109; 174/110 S R; 428/425.8; 524/114; 524/425; 524/433
[58] Field of Search ............ 524/109, 114, 425, 433; 428/425.8; 174/110 S R

[56] References Cited

U.S. PATENT DOCUMENTS

| | | | |
|---|---|---|---|
| 2,559,177 | 7/1951 | Terry et al. | 524/114 |
| 2,582,452 | 1/1952 | Olson et al. | 524/114 |
| 2,590,211 | 5/1952 | Rugar | 524/114 |
| 2,917,521 | 12/1959 | Phillips et al. | 524/114 |
| 2,963,490 | 12/1960 | Rowland et al. | 524/114 |
| 3,066,151 | 11/1962 | Thorn et al. | 524/114 |
| 3,148,167 | 9/1964 | Keplinger | 260/40 |
| 3,238,227 | 3/1966 | Tinsley et al. | 524/114 |
| 3,239,539 | 3/1966 | Bartlett et al. | 524/114 |
| 3,448,046 | 6/1969 | Schalin | 524/114 |
| 4,126,593 | 11/1978 | Takahashi | 524/425 |
| 4,127,542 | 11/1978 | Kaizerman et al. | 528/60 |
| 4,260,465 | 4/1981 | Via | 524/114 |
| 4,748,195 | 5/1988 | Hackl et al. | 524/405 |

FOREIGN PATENT DOCUMENTS 679666 10/1966 Belgium .
0189130 7/1986 European Pat. Off. .

OTHER PUBLICATIONS

R. P. Redman—"Developments in Polyurethane Elastomers"–Developments in Polyurethane-1, J. M. Buist editor, pp. 53–61 (1978).

Primary Examiner—Veronica P. Hoke
Attorney, Agent, or Firm—Frishauf, Holtz, Goodman & Woodward

[57] ABSTRACT

This invention discloses a flame retardant thermoplastic polyurethane resin composition containing a halogen flame retardant and a flame-retardant, water-resistant thin insulated wire prepared by applying the flame retardant thermoplastic polyurethane resin composition to a conductor to form an insulating layer having a thickness of 0.3 mm or less. The flame retardant thermoplastic polyurethane resin composition is prepared such that 0.2 to 20 parts by weight of a cycloparaffinic compound having an epoxy group is added to 100 parts by weight of a thermoplastic polyurethane resin alone or contained as a major constituent in a thermoplastic resin.

19 Claims, 2 Drawing Sheets

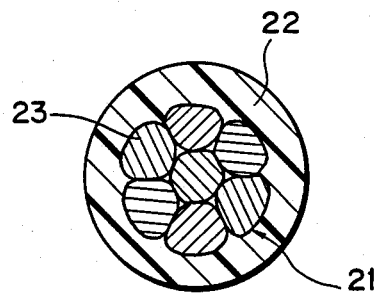
F I G. 1
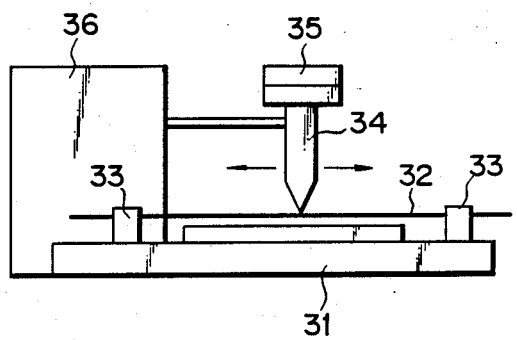
F I G. 2

FLAME RETARDANT THERMOPLASTIC POLYURETHANE RESIN COMPOSITION

BACKGROUND OF THE INVENTION

The present invention relates to a flame retardant thermoplastic polyurethane resin composition having excellent formability and water resistance.

A thermoplastic polyurethane resin has the advantages of both rubber and plastic materials and is used in a variety of applications such as tubes, electric wire insulation, and sheets. According to a method of molding such a resin, resin pellets are heated, plasticized, and melted, and the molten resin is molded by conventional thermoplastic resin molding equipment such as injection molding, extrusion molding, or the like.

In recent years, strict flame retardancy is required for the electric wires and the like in order to prevent accidents. From this point of view, a halogen flame retardant such as a halogen-containing phosphoric ester flame retardant is often mixed in the thermoplastic polyurethane resin.

A thermoplastic polyurethane resin having low hardness (e.g., Shore hardness A80 complying with test method ASTM 2240-75) is melted at about 180° C. to mold it. As the hardness of the resin is increased, it becomes harder to plasticize it. Thus, a thermoplastic polyurethane resin having high hardness (e.g., Shore hardness D75) is melted at about 240° C.

When molding continues for a long time under such temperature conditions, surface roughing or scorching occurs due to deterioration or thermal decomposition of the polyurethane resin left in the molding machine. As a result, the product often has poor appearance when molding continues. For this reason, the molding machine must be stopped, the interior of the machine must be cleaned and washed, and molding must be started again, thus greatly reducing productivity.

In particular, in extrusion molding, a molded body preferably has a uniform thickness along its longitudinal direction. However, since viscosity changes caused by a chemical reaction such as the above-mentioned thermal decomposition occur in the extruder, the amount of delivery changes and a molded body having a uniform thickness cannot often be obtained.

Continuous long-time formability of the thermoplastic polyurethane resin containing a halogen flame retardant is inferior to that of other thermoplastic resins such as polyethylene or polyvinyl chloride resin for the following reasons:

(i) An urethane bond is thermally weak, and a free NCO group generated at a molding temperature of 180° C. or higher tends to react with the urethane group to form a three-dimensional bond (crosslinking bond) such as an allophanate bond in the molding machine; and (ii) A halogen compound such as hydrogen halide generated by halogen elimination from the above-mentioned halogen flame retardant accelerates deterioration of the resin.

The water resistance of the resultant molded body tends to be undesirably degraded by hydrolysis caused by the hydrogen halide produced by decomposition of the flame retardant.

SUMMARY OF THE INVENTION

The present inventors conducted extensive studies to eliminate problems concerning molding of a thermoplastic polyurethane resin composition containing a halogen flame retardant and improve its water resistance and found that mixing of a cycloparaffinic compound having an epoxy group into the thermoplastic polyurethane resin was effective in solving the above problems. Therefore, the present inventors achieved the present invention.

According to the present invention, there is provided a flame retardant thermoplastic polyurethane resin composition containing a halogen flame retardant wherein 0.2 to 20 parts by weight of a cycloparaffinic compound having an epoxy group is mixed in 100 parts by weight of a thermoplastic polyurethane resin alone or contained as a major constituent in a thermoplastic resin.

Furthermore, according to the present invention, there is provided a thin insulated wire having excellent flame retardancy and water resistance wherein the above-mentioned flame retardant thermoplastic polyurethane resin composition is extrusion-coated on a conductor to form an insulating layer having a thickness of 0.3 mm or less.

BRIEF DESCRIPTION OF THE DRAWINGS

FIG. 1 is a sectional view of a flame retardant polyurethane insulated wire according to the present invention;

FIG. 2 is a schematic side view of a scrape tester used for measurement of abrasion resistance of the flame retardant polyurethane insulated wire of the present invention.

DETAILED DESCRIPTION OF THE PREFERRED EMBODIMENTS

Figure 3:
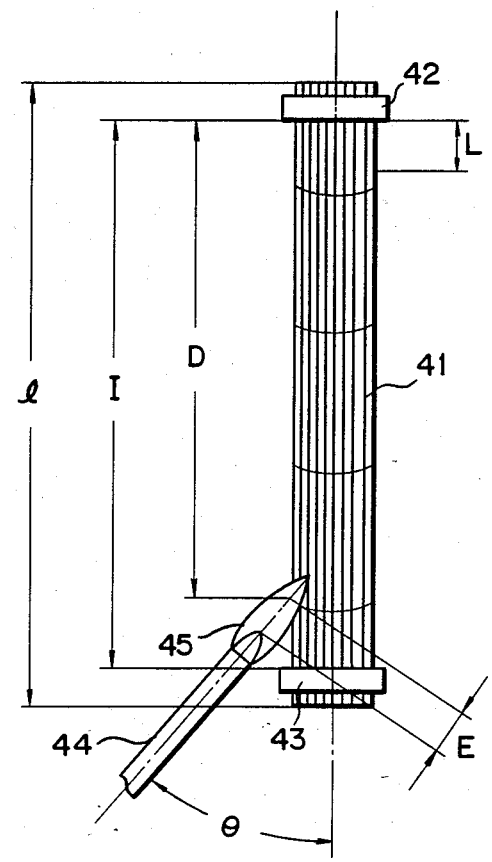
FIG. 3 is a schematic view of a device for testing flame retardancy of the flame retardant polyurethane insulated wire of the present invention.

A thermoplastic polyurethane resin used in the present invention is prepared by reacting a bifunctional polyol with a diisocyanate. More specifically, a bifunctional polyol, e.g., a polyester diol [e.g., poly(ethylene adipate), poly(1,4-butyl adipate), poly(1,6-hexane adipate), poly-ε-caprolactone, or poly(hexamethylene carbonate)] or a polyether diol (e.g., polyoxytetramethylene glycol), a glycol (e.g., 1,4-butylene glycol, 1,6-hexane diol, or ethylene glycol) as a chain coupling agent, and a diisocyanate (e.g., 4,4'-diphenylmethane diisocyanate, 4,4'-dicyclohexylmethane diisocyanate, or isophorone diisocyanate) are reacted with each other to prepare a polymer comprising a soft block of the polyol and diisocyanate and a hard block of the glycol and diisocyanate. This polymer is thermoplastic.

The hardness of the resin can be arbitrarily adjusted by changing a ratio of the hard segment to the soft segment. In particular, a thermoplastic urethane resin having Shore hardness A95 or more which requires a molding temperature of 200° C. or higher is very effective for use in the present invention.

The present invention is also applicable when a thermoplastic polymer (e.g., an ethylene-vinyl acetate copolymer, an ethylene-methyl acrylate copolymer, an ethylene-ethyl acrylate copolymer, polystyrene resin, an acrylonitrile-butadiene-styrene copolymer, methacrylic resin, nylon, or vinyl chloride resin) compatible with the above polyurethane resin and which is physically blendable therewith is mixed with the polyurethane resin in an amount of 50 wt% or less.

If the polyurethane resin is a polyester polyurethane resin or a blended resin, the most typical effect can be obtained.

Examples of the halogen flame retardant are a chlorine-containing phosphate [e.g., tris(2-chloroethyl)-phosphate or tris(dichloropropyl)phosphate], a bromine-containing phosphate [e.g., tris(2,3-dibromopropyl)phosphate], an aromatic bromine compound (e.g., dodecachlorododecahydrodimetanodibenzocyclooctene), an aromatic chlorine compound (e.g., decabromodiphenyloxide),and a flame retardant system using one of the above flame retardants and another flame retardant such as antimony trioxide. 5 to 20 parts by weights of such a flame retardant are preferably added to 100 parts by weight of the thermoplastic polyurethane resin alone or a thermoplastic resin containing the thermoplastic polyurethane resin. In order to mix such a flame retardant in a resin with good dispersibility, a liquid halogen-containing phosphate is preferably added during its synthesis. However, the flame retardant may be sprinkled in the resin during molding or masterbatched if a flame retardant powder is used.

A cycloparaffinic compound having an epoxy group is represented by compounds having the following groups.

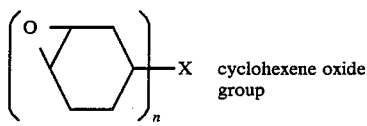(1) cyclohexene oxide group

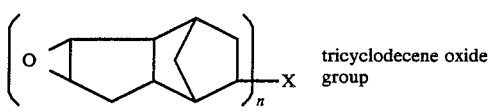(2) tricyclodecene oxide group

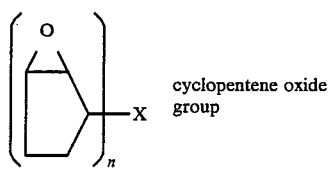(3) cyclopentene oxide group where X is a radical such as an ester, ether, acetal, imide, amide, or hydrocarbon and is exemplified by compounds having cyclic epoxy groups, such as Chissonox 221 (tradename) (*1), Chissonox 201 (*2), Chissonox 289 (*3), and Chissonox 206 (*4), all of which are commercially available from CHISSO CORPORATION, and Celloxide 2000 (tradename) (*5), Celloxide 3000 (*6), and Celloxide 4000 (*7), all of which are commercially available from DAICEL CHEMICAL INDUSTRIES, LTD. These compounds are commercially available as alicyclic epoxy resins.

(*1) Chissonox 221 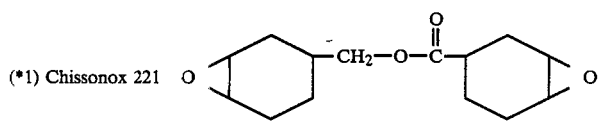

(*2) Chissonox 201 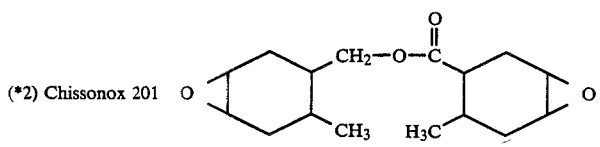

(*3) Chissonox 289 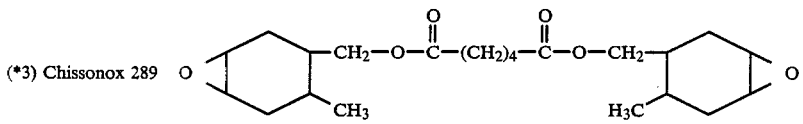

(*4) Chissonox 206 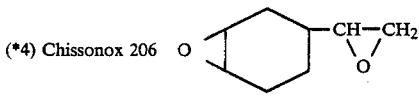

(*5) Celloxide 2000 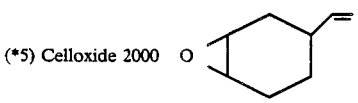

(*6) Celloxide 3000 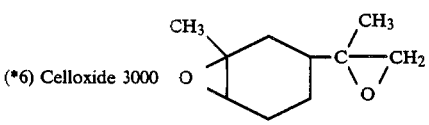

(*7) Celloxide 4000 

0.2 to 20 parts by weight and preferably 1 to 15 parts by weight of the cycloparaffinic compound are added to 100 parts by weight of the thermoplastic polyurethane resin alone or contained as a major constituent in a thermoplastic resin. If the content of the cycloparaffinic compound is less than 0.2 part by weight, the effect of the present invention cannot be obtained. However, if the content exceeds 20 parts by weight, the effect is not further enhanced.

For this purpose, other epoxy resins may be used together with the cycloparaffinic compound having an epoxy group so as not to degrade the effect of the present invention.

In order to mix an epoxy compound or the like in a resin such as a thermoplastic polyurethane resin, in molding by an extruder or an injection molding machine, any method can be utilized: a method of sprinkling the compound on the resin, a method of supplying the compound under pressure by utilizing a quantitative pump in the molding machine and of melting and kneading the compound and the resin, or a method of reacting the polyol component with the diisocyanate compound and mixing the compound in the synthesis of the polyurethane resin. In the last method, no problem occurs when synthesis conditions (temperature and time) are determined so as not to allow the progress of a reaction between the NCO group of the diisocyanate component and the OH group of the polyol component and the epoxy group.

An alkaline earth metal carbonate or oxide or a compound containing the carbonate or oxide is mixed in the flame retardant thermoplastic polyurethane resin composition of the present invention to greatly improve water resistance.

Examples of the alkaline earth metal oxide are calcium oxide and magnesium oxide, which are obtained by substituting X in formula XO with alkaline earth metal elements. Examples of the alkaline earth metal carbonate are calcium carbonate, barium carbonate, and magnesium carbonate, which are obtained by substituting H in $HCO_3$ with alkaline earth metal elements. An example of the compounds containing alkaline earth metal carbonate and oxide is magnesium hydroxycarbonate [$MgCO_3 \cdot Mg(OH)_2 \cdot 2H_2O$].

The content of such a compound falls within the range of 0.01 to 15.0 parts by weight with respect to 100 parts by weight of the thermoplastic polyurethane resin alone or contained as a major constituent in a thermoplastic resin. If the content of the compound is less than 0.01 part by weight, the effect of the present invention cannot be achieved. However, if the content exceeds 15.0 parts by weight, the molded product has poor appearance due to surface roughing.

The alkaline earth metal carbonate or oxide is mixed by sprinkling in the resin during molding by means of an extruder, an injection molding machine, or the like or is masterbatched. Alternatively, the carbonate or oxide may be mixed in the resin during synthesis of the polyurethane resin prepared by reacting the polyol component with the diisocyanate component.

Assistant agents such as carbon black, a blowing agent, an antioxidant, a mildew proofing agent, and a coloring agent can be added within the range which does not change the properties of the resultant composition. These assistant agents can be added any time if they do not interfere with the synthesis reaction between the polyol and diisocyanate. However, if they interfere with synthesis reaction these agents are preferably added to the resin during molding.

A cyclohexene oxide, as an example of the above epoxy compound, is represented by the following formula:

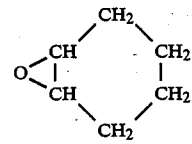

In the thermoplastic polyurethane resin composition containing the halogen flame retardant, a free halogen compound and a free NCO group are produced by heat applied in the molding machine. The compound having an epoxy group reacts with the free halogen compound and the free NCO group. However, in the present invention, the epoxy group of the epoxy compound is located in a six-membered ring. Therefore, reactivity between the epoxy group and the NCO group is greatly weakened, while that between the epoxy group and the halogen compound is accelerated.

When a bisphenol A type epoxy resin as a typical example of a halogen trapping agent of a general-purpose vinyl chloride resin is used, the epoxy group serves as a molecular terminal group, the reactivity between the epoxy group and the NCO group is enhanced to eliminate the epoxy group, and the halogen trapping effect inherent to this resin cannot be achieved.

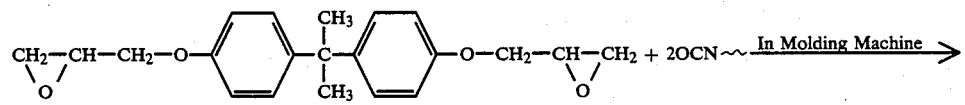

-continued

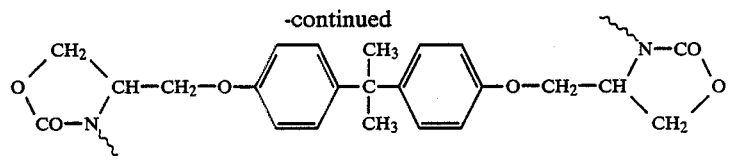

(∿: a polymer chain)

The different reactivities between the epoxy group and the NCO group according to different structures of the epoxy groups can be assumed as follows. Since the NCO group has a resonance structure as in the following formula and electrons between the oxygen and carbon atoms are polarized in the epoxy group as in the following formula, an ionic reaction is assumed to occur between the NCO group and the epoxy group.

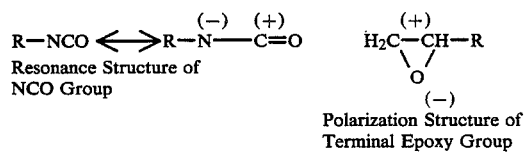

Resonance Structure of NCO Group

Polarization Structure of Terminal Epoxy Group

In cyclohexene oxide as an example of the epoxy compound in the present invention, four atoms $C_6$, $C_1$, $C_2$, and $C_3$ are located on a single plane, atoms $C_4$ and $C_5$ are located behind the epoxy group and extend vertically from the plane defined by atoms $C_6$, $C_1$, $C_2$, and $C_3$.

For this reason, very large steric hindrance is assumed in order to allow the nitrogen atom of the NCO group to react with the carbon atom of the epoxy group:

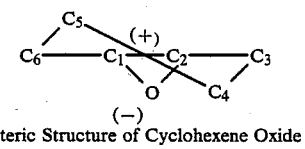

Steric Structure of Cyclohexene Oxide

The halogen trapping reaction is given such that a halogen compound is added to an oxygen atom of the epoxy group, and therefore the reactivity tends not to be weakened due to the steric hindrance.

When the cycloparaffinic compound having an epoxy group is mixed in the thermoplastic polyurethane resin containing a halogen flame retardant, scorching and surface roughing can be prevented.

In order to perfectly prevent a crosslinking reaction for bonding the molecules, a cycloalkane compound preferably contains one epoxy group in one molecule.

The improvement of water resistance of the composition of the present invention can be explained as follows.

In the polyurethane resin containing the halogen flame retardant, since halogenated hydrogen produced by the decomposition of the flame retardant is acidic, it serves as a catalyst in hydrolysis, thus undesirably increasing the water-resistance degradation rate.

When cyclohexene oxide as an example of the cycloparaffinic compound having an epoxy group is added to the polyurethane resin containing the halogen flame retardant, cyclohexene oxide can be easily reacted with halogenated hydrogen for the above reason, thereby inactivating halogenated hydrogen. In order to further improve the water resistance of the resin, if calcium oxide or carbonate as an example of the alkaline earth metal oxide or carbonate of the present invention is added to the resin, the following reaction occurs and hydrogen halide is inactivated.

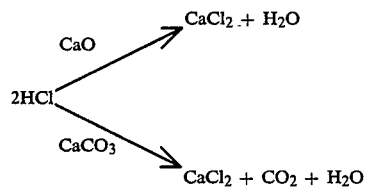

The present invention is effectively applied to a polyester-polyurethane resin of the polyurethane resins for the following reason.

A molecular chain having an ester bond in polyester-based polyurethane has a structure represented by the following formula and is subjected to hydrolysis with water.

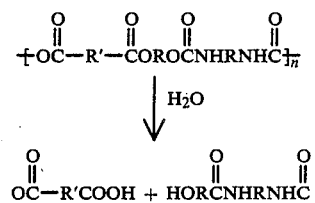

The fatty acid produced by the decomposition is acidic and serves as a hydrolytic catalyst in the same manner as hydrogen halide, thereby increasing the water-resistance degradation rate.

When cyclohexene oxide and calcium carbonate as components of the composition of the present invention are added, the fatty acid is inactivated due to the same mechanism as in hydrogen halide, thereby improving the water resistance of the composition.

The present invention will be described in detail by way of Examples 1 to 26 and Comparative Examples 1 to 4.

Comparative Example 1

1,000 g of dehydrated chain caprolactone having a molecular weight of 2,000 and 56 hydroxyl number, 320 g of 1,4-butane diol, and 1,100 g of 4,4'-diphenylmethane diisocyanate were stirred at 82° C. for about 2 minutes, and the resultant mixture was poured on a heated molding plate (115° to 120° C.) and was left to stand for about 10 minutes. Thereafter, the mixture was further left to stand on the molding plate at room temperature for 48 hours. The mixture was then granulated (stage I).

20 parts of tris(2-chloroethyl)phosphate were added to 100 parts of the resultant thermoplastic polyurethane resin (Shore hardness D68) and uniformly blended by a blender. The resultant mixture was extruded by a 210° C. extruder to obtain an insulated wire having an outer diameter of 2.0 mm (outer diameter of conductor: 1.60 mm) for about 3 hours (stage II). Changes in outer diameter of the insulated wire and its outer appearance were observed in detail.

The extruder was stopped and an extrusion screw 5 was removed. The scorched resin on the screw was checked. Results are summarized in Table 1.

Flame retardancy, tensile properties, and water resistance of the insulated harness wire of FIG. 1 and the resultant insulated wire were evaluated.

The insulated harness wire shown in FIG. 1 is obtained by compression-molding a stranded wire consisting of a large number of strands, thereby obtaining compressed conductor 21 having a circular cross section. Insulating layer 22 having a thickness of 0.2 mm or less is formed on compressed conductor 21.

In order to form compressed conductor 21, the stranded wire is squeezed through a die or a molding roll and the outer diameter of the stranded wire is thus reduced. Strands 23 are compressed and deformed in a noncircular manner so as to fill the gaps in the stranded wire. Therefore, the strands are not separated from each other or not projected from the stranded wire, so that the cross section of the stranded wire becomes substantially circular. Even if the thickness of insulating layer 22 is as small as 0.2 mm or less, variations in thickness of the thin layer are reduced.

The insulated wire was tested according to the following method.

Abrasion resistance of the insulated harness wire is represented by the number of scrape test cycles. The scrape test is performed using a scrape tester shown in FIG. 2. Insulated wire sample 32 is fixed on firing base 31 with fixing clamps 33 in the horizontal position. Scrape blade 34 having a 0.125-mm R edge is placed on sample 32. Scrape blade 34 is reciprocally moved by mechanism 36 with a stroke of about 10 mm while weight (outer diameter of conductor 1.6 mm; 1.2 kg) 35 corresponding to a wire size is placed on blade 34. In this manner, sample 32 is rubbed with scrape blade 34. When the insulating layer is cut and scrape blade 34 is brought into contact with the conductor, the operation of mechanism 36 is stopped, and the number of reciprocal cycles is displayed on a counter. A count of 12 or more is required for the insulated harness wire.

The flame retardancy test is performed as follows, as shown in FIG. 3. Then wires 41 each having a length l of about 600 mm are bundled with a 0.32-mm diameter copper wire at five positions at intervals of about 100 mm to prepare a sample. The sample is vertically fixed by support members 42 and 43 such that distance I between members 42 and 43 is set at 550±25 mm. Flame 45 from Bunsen burner 44 is continuously brought into contact with the sample for 1 minute at an angle θ of 45° at a position having distance D of 475 mm from upper support member 42 in such a manner that 10-mm long reducing flame portion E is located at a sample portion corresponding to the above-mentioned flame position. The evaluation of flame retardancy is given such that a sample having length L exceeding 50 mm or more (FIG. 3) is accepted as a good product.

The tensile test was performed complying with JIS (Japanese Industrial Standard) C3005 (item 16).

The water resistance test was performed in the following manner. A core wire was pulled from the insulated wire. The insulating layer was dipped in hot water at 100° C. and its tensile properties with the passage of time were measured. The number of days corresponding to an absolute elongation of 50% was measured. Test results are summarized in Table 1.

Comparative Example 2

An insulated wire was prepared following the same procedures as in Comparative Example 1 except that a stabilizer EPICOAT 828 (tradename) having the following formula:

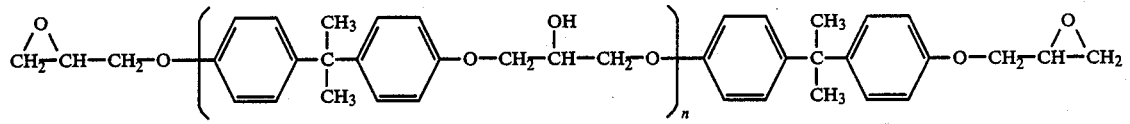

was added in stage II of Comparative Example 1. Results are summarized in Table 1.

Examples 1–6

Samples were prepared following the same procedures as in Comparative Example 1 except that stabilizers shown in Table 1 were added in stage II of Comparative Example 1. Results are summarized in Table 1.

Examples 7–9

In Example 3, long-run properties of samples, i.e., every 10 hours (Example 7), every 20 hours (Example 8), and every 30 hours (Example 9) were measured. Test results are summarized in Table 1.

Examples 10–12

Samples were prepared following the same procedures as in Comparative Example 1 except that stabilizers and inorganic materials were added in stage II of Comparative Example 1. Results are summarized in Table 1.

Example 13

A sample was prepared following the same procedures as in Example 2 except that the same composition as in Example 2 was added in stage I of Comparative Example 1. Results are summarized in Table 1.

Example 14

A sample was prepared following the same procedures as in Example 10 except that the same composition as in Example 3 was used.

Examples 15–17

In Example 11, long-run properties of samples, i.e., every 10 hours (Example 15), every 20 hours (Example 16), and every 30 hours (Example 17) were tested, and results are summarized in Table 1.

Examples 18–21

Samples were prepared following the same procedures as in Comparative Example 1 except that other polymers are mixed with a polyurethane resin obtained in stage I of Comparative Example 1 in stage II thereof at mixing ratios of Table 1, and that stabilizers and inorganic materials in Table 1 were added. Results are summarized in Table 1.

Comparative Example 3

20 parts by weight of tris(2-chloroethyl)phosphate was added to 100 parts by weight of polyether type polyurethane resin E-395PNAT (tradename) (Shore hardness: A95), which is not flame retardant, available from NIPPON MIRACTRAN COMPANY LIMITED, and they were mixed by a blender. The resultant mixture was extruded by a 180° C. extruder to obtain an insulated wire having an outer diameter of 2.0 mm (outer diameter of conductor: 1.60 mm) for 3 hours. The sample was evaluated following the same procedures as in Comparative Example 1. Results are summarized in Table 1.

Comparative Example 4

A sample was prepared following the same procedures as in Comparative Example 3 except that a stabilizer (EPICOAT 828: tradename) as in Comparative Example 2 was added to a composition as in Comparative Example 3, and the evaluation of the sample was performed following the same procedures as in Comparative Example 1. Results are summarized in Table 1.

Example 22

A sample was prepared following the same procedures as in Comparative Example 3 except that the stabilizer in Table 1 was added to a composition as in Comparative Example 3, and the evaluation of the sample was performed following the same procedures as in Comparative Example 1. Results are summarized in Table 1.

Example 23

A sample was prepared following the same procedures as in Comparative Example 3 except that the stabilizer and the inorganic material in Table 1 were added to a composition as in Comparative Example 3, and the evaluation of the sample was performed following the same procedures as in Comparative Example 1. Results are summarized in Table 1.

Example 24

Tris(2-chloroethyl)phosphate, the stabilizer and the inorganic material in Table 1 were added to 100 parts by weight of polycaprolactone type polyurethane resin E-574PNAT (tradename) (Shore hardness: D74), which is not flame retardant, available from NIPPON MIRACTRAN COMPANY LIMITED, and they were mixed by a blender. The resultant mixture was extruded by a 230° C. extruder to obtain an insulated wire having an outer diameter of 2.0 mm (outer diameter of conductor: 1.60 mm) for 3 hours. The sample was evaluated following the same procedures as in Comparative Example 1. Results are summarized in Table 1.

Example 25

A sample was prepared following the same procedures as in Example 24 except that polycaprolactone type polyurethane resin E-595PNAT (tradename) (Shore hardness: A95), which is not flame retardant, available from NIPPON MIRACTRAN COMPANY LIMITED was used as a polyurethane resin, and the evaluation of the sample was performed following the same procedures as in Comparative Example 1. Results are summarized in Table 1.

Example 26

A sample was prepared following the same procedures as in Example 24 except that polycarbonic acid ester type polyurethane resin E-968PNAT (tradename) (Shore hardness: D68), which is not flame retardant, available from NIPPON MIRACTRAN COMPANY LIMITED was used as a polyurethane resin, and the evaluation of the sample was performed following the same procedures as in Comparative Example 1. Results are summarized in Table 1.

As is apparent from the above description and examples, the secondary reaction in the molding machine can be restricted by the presence of the cycloparaffinic compound containing an epoxy group and the inorganic compound in the composition of a thermoplastic polyurethane resin containing a halogen flame retardant or the composition, which contains a halogen flame retardant, of the thermoplastic resin containing the thermoplastic polyurethane resin as a major constituent. Therefore, formability can be stabilized, and water resistance of the products can be greatly improved. The resin composition of the present invention is particularly effective for a thin insulated harness wire having Shore hardness of D68 and more and provides good industrial advantages.

TABLE 1

| | Composition (parts by weight) | | | | |
|---|---|---|---|---|---|
| | Polyurethane Resin | Other Polymers | Flame Retardant | Stabilizer | Inorganic Material |
| Comparative Example | | | | | |
| 1 | 100 Polycaprolactone (D = 68) | | 20 | | |
| 2 | 100 Polycaprolactone (D = 68) | | 20 | 3 Epicoat 828 (tradename) | |
| Example | | | | | |
| 1 | 100 Polycaprolactine (D = 68) | | " | 3 Chissonox 201 (tradename) | |
| 2 | 100 Polycaprolactone (D = 68) | | " | 3 Chissonox 221 (tradename) | |
| 3 | 100 Polycaprolactone | | " | 3 Celloxide 2000 | |

TABLE 1-continued

| | | | | | |
|---|---|---|---|---|---|
| 4 | (D = 68) 100 Polycaprolactone (D = 68) | | " | (tradename) 3 Chissonox 206 (tradename) | |
| 5 | 100 Polycaprolactone (D = 68) | | " | 3 Celloxide 3000 (tradename) | |
| 6 | 100 Polycaprolactone (D = 68) | | " | 3 Celloxide 4000 (tradename) | |
| 7 | 100 Polycaprolactone (D = 68) | | " | 3 Celloxide 2000 (tradename) | |
| 8 | 100 Polycaprolactone (D = 68) | | " | 3 Celloxide 2000 (tradename) | |
| 9 | 100 Polycaprolactone (D = 68) | | 20 | 3 Celloxide 2000 (tradename) | |
| 10 | 100 Polycaprolactone (D = 68) | | " | 3 Chissonox 221 (tradename) | 0.4 CaCO₃ |
| 11 | 100 Polycaprolactone (D = 68) | | " | 3 Chissonox 221 (tradename) | 0.4 Mgo |
| 12 | 100 Polycaprolactone (D = 68) | | 20 | 3 Chissonox 221 (tradename) | 10 CaCO₃ |
| 13 | Same as Example 2 (Addition during synthesis) | | | | |
| 14 | Same as Example 3 (Addition during synthesis) | | | | |
| 15 | 100 Polycaprolactone (D = 68) | | 20 | 3 Chissonox 221 (tradename) | 0.4 CaCO₃ |
| 16 | 100 Polycaprolactone (D = 68) | | " | 3 Chissonox 221 (tradename) | 0.4 CaCO₃ |
| 17 | 100 Polycaprolactone (D = 68) | | " | 3 Chissonox 221 (tradename) | 0.4 CaCO₃ |
| 18 | 70 Polycaprolactone (D = 68) | 30 PMMA*¹ | 20 | 3 Chissonox 221 (tradename) | |
| 19 | 70 Polycaprolactone (D = 68) | 30 PMMA | " | 3 Chissonox 221 (tradename) | 0.01 CaCO₃ |
| 20 | 60 Polycaprolactone (D = 68) | 20 PMMA  20 EEA*² | " | 3 Chissonox 221 (tradename) | 1 CaCO₃ |
| 21 | 60 Polycaprolactone (D = 68) | 20 ABS*³  20 EMA*⁴ | " | 3 Chissonox 221 (tradename) | 5 CaCO₃ |
| 22 | 100 Polyether type resin (A = 95) | | " | 3 Chissonox 221 (tradename) | |
| 23 | 100 Polyether type resin (A = 95) | | " | 3 Chissonox 221 (tradename) | 0.4 CaCO₃ |
| 24 | 100 Polycaprolactone (D = 74) | | " | 3 Chissonox 221 (tradename) | 0.4 CaCO₃ |
| 25 | 100 Polycaprolactone (A = 95) | | " | 3 Chissonox 221 (tradename) | 0.4 CaCO₃ |
| 26 | 100 Polycarbonate (D = 68) | | " | 3 Chissonox 221 (tradename) | 0.4 CaCO₃ |
| Comparative Example | | | | | |
| 3 | 100 Polyether type resin (A = 95) | | 20 | | |
| 4 | 100 Polyether type resin (A = 95) | | " | 3 Epicoat 828 (tradename) | |

| | Extrusion Workability | | |
|---|---|---|---|
| | Outer Appearance of Wire | Outer Diameter of Wire | Screw after Extrusion |
| Comparative Example | | | |
| 1 | Defective because scorching and roughing occur | Unstabilized in 2.10 to 1.50 mm from the | Change in color of entire screw to brown by |

TABLE 1-continued

|   | 30 minutes after extrusion | start of extrusion | scorching |
|---|---|---|---|
| 2 | Defective because roughing occurs an hour after extrusion | Unstabilized in 2.10 to 1.40 mm from the start of extrusion | Change in color of entire screw to brown by scorching |

Example

|   |   |   |   |
|---|---|---|---|
| 1 | Good because no roughing occurs within 3 hours | Kept stable in 1.81 to 2.13 mm within 3 hours | Small amount of scorched resin pieces at accumulation positions |
| 2 | Good because no roughing occurs within 3 hours | Kept stable in 1.80 to 2.16 mm within 3 hours | Small amount of scorched resin pieces at accumulation positions |
| 3 | Good because no roughing occurs within 3 hours | Kept stable in 1.90 to 2.16 mm within 3 hours | No accumulated scorched resin |
| 4 | Good because roughing does not occur for 3 hours | Kept in 1.75 to 2.23 mm within 3 hours | Scorching in accumulation positions |
| 5 | Good because roughing does not occur for 3 hours | Kept in 1.80 to 2.35 mm within 3 hours | Scorching in accumulation positions |
| 6 | Good because roughing does not occur for 3 hours | Kept in 1.80 to 2.32 mm within 3 hours | Scorching in accumulation positions |
| 7 | Good because scorching and roughing do not occur for 10 hours | Kept stable in 1.90 to 2.16 mm within 10 hours | No accumulated scorched resin |
| 8 | Good because scorching and roughing do not occur for 20 hours | Kept stable in 1.90 to 2.16 mm within 20 hours | Small amount of scorched resin in accumulation positions |
| 9 | Good because scorching and roughing do not occur for 30 hours | Kept stable in 1.90 to 2.16 mm within 30 hours | Small amount of scorched resin in accumulation positions |
| 10 | Good because no roughing occurs within 3 hours | Kept stable in 1.80 to 2.15 mm within 3 hours | Small amount of scorched resin in accumulation positions |
| 11 | Good because no roughing occurs within 3 hours | Kept stable in 1.85 to 2.15 mm within 3 hours | Small amount of scorched resin in accumulation positions |
| 12 | Good because no roughing occurs within 3 hours | Kept stable in 1.80 to 2.18 mm within 3 hours | Small amount of scorched resin in accumulation positions |
| 13 | Good because no roughing occurs within 3 hours | Kept stable in 1.85 to 2.19 mm within 3 hours | Small amount of scorched resin in accumulation positions |
| 14 | Good because no roughing occurs within 3 hours | Kept stable in 1.83 to 2.15 mm within 3 hours | Small amount of scorched resin in accumulation positions |
| 15 | Good because scorching and roughing do not occur for 10 hours | Kept stable in 1.83 to 2.15 mm within 10 hours | Small amount of scorched resin in accumulation positions |
| 16 | Good because scorching and roughing do not occur for 20 hours | Kept stable in 1.83 to 2.15 mm within 20 hours | Small amount of scorched resin in accumulation positions |
| 17 | Good because scorching and roughing do not occur for 30 hours | Kept stable in 1.83 to 2.15 mm within 30 hours | Small amount of scorched resin in accumulation positions |
| 18 | Good because no roughing occurs within 3 hours | Kept stable in 1.80 to 2.17 mm within 3 hours | Small amount of scorched resin in accumulation positions |
| 19 | Good because no roughing occurs within 3 hours | Kept stable in 1.82 to 2.16 mm within 3 hours | Small amount of scorched resin in accumulation positions |
| 20 | Good because no roughing occurs within 3 hours | Kept stable in 1.80 to 2.15 mm within 3 hours | Small amount of scorched resin in accumulation positions |
| 21 | Good because no roughing occurs within 3 hours | Kept stable in 1.80 to 2.16 mm within 3 hours | Small amount of scorched resin in accumulation positions |
| 22 | Good because no roughing occurs within 3 hours | Kept stable in 1.85 to 2.21 mm within 3 hours | Small amount of scorched resin in accumulation positions |
| 23 | Good because no roughing occurs within 3 hours | Kept stable in 1.90 to 2.25 mm within 3 hours | Small amount of scorched resin in accumulation positions |
| 24 | Good because scorching and roughing do not occur for 3 hours | Kept stable in 1.85 to 2.09 mm within 3 hours | Small amount of scorched resin in accumulation positions |
| 25 | Good because scorching and roughing do not occur for 3 hours | Kept stable in 1.86 to 2.17 mm within 3 hours | Small amount of scorched resin in accumulation positions |
| 26 | Good because scorching and roughing do not occur for | Kept stable in 1.88 to 2.15 mm within | Small amount of scorched resin in accumulation |

TABLE 1-continued

| | 3 hours | 3 hours | positions |
|---|---|---|---|
| Comparative Example | | | |
| 3 | Defective because scorching and roughing occur 30 minutes after extrusion | Unstabilized in 2.15 to 1.40 mm from the start of extrusion | Change in color of entire screw to brown by scorching |
| 4 | Defective because roughing occurs 2 hours after extrusion | Unstabilized in 2.10 to 1.35 mm from the start of extrusion | Change in color of entire screw to brown by scorching |

| | Property Evaluation | | | | | |
|---|---|---|---|---|---|---|
| | Scrape Abrasion (cycle) | Flame Retardancy | Tensile Strength (kg/mm$^2$) | Elongation (%) | Water Resistance (number of days of degradation) | Total Evaluation |
| Comparative Example | | | | | | |
| 1 | 32 | Accepted | 4.9 | 210 | 3 | x |
| 2 | 37 | " | 5.2 | 190 | 5 | x |
| Example | | | | | | |
| 1 | 35 | " | 4.8 | 230 | 8 | o |
| 2 | 36 | " | 4.7 | 250 | 8 | o |
| 3 | 31 | " | 4.9 | 240 | 8 | o |
| 4 | 33 | " | 4.9 | 220 | 6 | Δ |
| 5 | 35 | " | 5.1 | 210 | 6 | Δ |
| 6 | 31 | " | 5.0 | 200 | 7 | Δ |
| 7 | 35 | " | 4.8 | 250 | 8 | o |
| 8 | 32 | " | 4.7 | 260 | 8 | o |
| 9 | 33 | Accepted | 4.9 | 240 | 8 | o |
| 10 | 33 | " | 4.7 | 260 | 14 | ⊚ |
| 11 | 32 | " | 5.1 | 240 | 14 | ⊚ |
| 12 | 35 | " | 5.0 | 260 | 16 | ⊚ |
| 13 | 34 | " | 4.8 | 240 | 8 | o |
| 14 | 33 | " | 4.9 | 230 | 14 | ⊚ |
| 15 | 34 | " | 5.1 | 210 | 14 | ⊚ |
| 16 | 35 | " | 5.0 | 230 | 14 | ⊚ |
| 17 | 31 | " | 4.8 | 240 | 14 | ⊚ |
| 18 | 32 | Accepted | 5.6 | 170 | 9 | o |
| 19 | 31 | " | 5.5 | 180 | 12 | ⊚ |
| 20 | 30 | " | 5.0 | 230 | 14 | ⊚ |
| 21 | 34 | " | 5.1 | 240 | 15 | ⊚ |
| 22 | 6 | " | 2.7 | 350 | 98 | ⊚ |
| 23 | 5 | " | 2.6 | 370 | 120 | ⊚ |
| 24 | 52 | " | 5.5 | 230 | 14 | ⊚ |
| 25 | 13 | " | 3.8 | 260 | 12 | ⊚ |
| 26 | 32 | " | 4.9 | 210 | 14 | ⊚ |
| Comparative Example | | | | | | |
| 3 | 6 | Accepted | 2.5 | 330 | 63 | x |
| 4 | 7 | " | 2.6 | 340 | 70 | x |

O... Excellent
o... Good
Δ... Fair
x... No Good
*[1]Methacrylic Resin
*[2]Ethylene-Ethyl Acrylate Resin
*[3]Acrylonitrile-butadiene-styrene Resin
*[4]Ethylene-methyl Acrylate Resin

What is claimed is:

1. A flame retardant thermoplastic polyurethane composition comprising a thermoplastic polyurethane resin or a thermoplastic resin containing a thermoplastic polyurethane resin as a major constituent thereof; a halogen flame retardant; and from 0.2 to 20 parts by weight of a compound having a cyclohexene oxide group per 100 parts by weight of said thermoplastic polyurethane resin or said thermoplastic resin containing said thermoplastic polyurethane resin as a major constituent thereof.

2. The composition of claim 1 comprising 0.01 to 15 parts by weight of an oxide or carbonate of an alkaline earth metal per said 100 parts of resin.

3. The composition of claim 1 wherein said thermoplastic polyurethane resin contains at least 50 wt% of a polyurethane resin having an ester bond.

4. The composition of claim 1 wherein said halogen flame retardant is at least one compound selected from the group consisting of a chlorine-containing phosphate, a bromine-containing phosphate, an aromatic bromine compound, and an aromatic chlorine compound.

5. The composition of claim 1 wherein said halogen flame retardant is in an amount of from 5 to 25 parts by weight per said 100 parts of resin.

6. The composition of claim 1 wherein said thermoplastic polyurethane composition comprises a thermoplastic polyurethane resin and a thermoplastic resin selected from the group consisting of an ethylene-vinyl acetate copolymer, an ethylene-ethyl acrylate copolymer, an ethylene-methyl acrylate copolymer, methacrylic resin, an acrylonitrile-butadiene-styrene copolymer, nylon, and polyvinyl chloride.

7. The composition of claim 1 which is molded and has a Shore hardness of A95 or higher.

8. The composition of claim 5 wherein said compound having a cyclohexene oxide group was added in an amount of from 1 to 15 parts per said 100 parts of resin;

said halogen flame retardant is at least one compound selected from the group consisting of a chlorine-containing phosphate, a bromine-containing phosphate, an aromatic bromine compound, and an aromatic chlorine compound; and said thermoplastic polyurethane composition comprises a thermoplastic polyurethane resin and a thermoplastic resin selected from the group consisting of an ethylene-vinyl acetate copolymer, an ethylene-ethyl acrylate copolymer, an ethylene-methyl acrylate copolymer, methacrylic resin, an acrylonitrile-butadiene-styrene copolymer, nylon, and polyvinyl chloride.

9. The composition of claim 8 wherein said thermoplastic polyurethane resin contains at least 50 wt% of a polyurethane resin having an ester bond.

10. The composition of claim 9 comprising 0.01 to 15 parts by weight of an oxide or carbonate of an alkaline earth metal per said 100 parts of resin.

11. A flame retardant polyurethane insulated wire having good water resistance, produced by extruding a flame retardant thermoplastic polyurethane resin composition containing a halogen flame retardant on a wire conductor to form an insulating layer having a thickness of not more than 0.3 mm, said flame retardant thermoplastic polyurethane resin composition being prepared by admixing a halogen flame retardant and 0.2 to 20 parts by weight of a compound having a cyclohexene oxide group with 100 parts by weight of a thermoplastic polyurethane resin or a thermoplastic resin containing a thermoplastic urethane resin as a major constituent thereof.

12. The flame retardant polyurethane insulated wire of claim 11 wherein
said halogen flame retardant is in an amount of from 5 to 25 parts by weight per said 100 parts of resin; and
said compound having a cyclohexene oxide group is admixed in an amount of from 1 to 15 parts per said 100 parts of resin.

13. The flame retardant polyurethane insulated wire of claim 12 wherein
said halogen flame retardant is at least one compound selected from the group consisting of a chlorine-containing phosphate, a bromine-containing phosphate, an aromatic bromine compound, and an aromatic chlorine compound;
said thermoplastic polyurethane composition comprises a thermoplastic polyurethane resin and a thermoplastic resin selected from the group consisting of an ethylene-vinyl acetate copolymer, an ethylene-ethyl acrylate copolymer, an ethylene-methyl acrylate copolymer, methacrylic resin, an acrylonitrile-butadiene-styrene copolymer, nylon, and polyvinyl chloride; and
also contains between 0.01 and 15 parts by weight of an oxide or carbonate of an alkaline earth metal per said 100 parts of resin.

14. The flame retardant polyurethane insulated wire of claim 13 wherein said thermoplastic polyurethane resin contains at least 50 wt% of a polyurethane resin having an ester bond.

15. The flame retardant polyurethane insulated wire of claim 14 wherein said thermoplastic polyurethane composition comprises a thermoplastic polyurethane resin.

16. The flame retardant polyurethane insulated wire of claim 14 wherein said thermoplastic polyurethane resin comprises a thermoplastic polyurethane composition and a thermoplastic resin selected from the group consisting of an ethylene-vinyl acetate copolymer, an ethylene-ethyl acrylate copolymer, an ethylene-methyl acrylate copolymer, methacrylic resin, an acrylonitrile-butadiene-styrene copolymer, nylon, and polyvinyl chloride.

17. The flame retardant polyurethane insulated wire of claim 12 wherein said thermoplastic polyurethane resin contains at least 50 wt% of a polyurethane resin having an ester bond.

18. The flame retardant polyurethane insulated wire of claim 12 wherein said thermoplastic polyurethane composition comprises a thermoplastic polyurethane resin.

19. The flame retardant polyurethane insulated wire of claim 12 wherein said thermoplastic polyurethane resin comprises a thermoplastic polyurethane composition and a thermoplastic resin selected from the group consisting of an ethylene-vinyl acetate copolymer, an ethylene-ethyl acrylate copolymer, an ethylene-methyl acrylate copolymer, methacrylic resin, an acrylonitrile-butadiene-styrene copolymer, nylon, and polyvinyl chloride.

* * * * *